(12) United States Patent
Zhang et al.

(10) Patent No.: US 9,781,804 B2
(45) Date of Patent: Oct. 3, 2017

(54) LIGHT REGULATING APPARATUS WITH FEED FORWARD COMPENSATION AND LIGHT REGULATING METHOD THEREOF

(71) Applicant: DELTA ELECTRONICS (SHANGHAI) CO., LTD., Shanghai (CN)

(72) Inventors: Wei-Qiang Zhang, Shanghai (CN); Xiao-Peng Wang, Shanghai (CN); Zhi-Hui Ding, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 188 days.

(21) Appl. No.: 14/484,016

(22) Filed: Sep. 11, 2014

(65) Prior Publication Data

US 2015/0163882 A1    Jun. 11, 2015

(30) Foreign Application Priority Data

Dec. 11, 2013   (CN) .......................... 2013 1 0673948

(51) Int. Cl.
*H05B 33/08* (2006.01)
*H02M 1/00* (2006.01)
*H02M 3/335* (2006.01)

(52) U.S. Cl.
CPC ..... *H05B 33/0887* (2013.01); *H05B 33/0815* (2013.01); *H05B 33/0821* (2013.01);
(Continued)

(58) Field of Classification Search
CPC ......... H02M 3/33523; H02M 3/33507; H02M 2001/0019
See application file for complete search history.

(56) References Cited

U.S. PATENT DOCUMENTS 6,970,503 B1    11/2005   Kalb
2008/0224634 A1   9/2008   Scilia
(Continued)

FOREIGN PATENT DOCUMENTS

CN    102332826 A    1/2012
CN    102333405      1/2012
(Continued)

*Primary Examiner* — Jue Zhang
*Assistant Examiner* — Lakaisha Jackson
(74) *Attorney, Agent, or Firm* — CKC & Partners Co., Ltd.

(57) ABSTRACT

A light regulating apparatus includes a converter, a load circuit, and a controller. The converter is configured to output a load current signal according to a controlling signal. The load circuit is driven by the load current signal. The controller is configured to generate the control signal. The controller includes an error calculation unit, a regulation unit, a feed forward compensation unit, and an addition unit. The error calculation unit is configured to generate a first error signal according to a reference current signal and a feedback signal. The regulation unit is configured to generate a regulating signal according to the error signal. The feed forward compensation unit is configured to generate a feed forward compensation signal according to the reference current signal. The addition unit is configured to generate the control signal according to the regulation signal and the feed forward compensation signal.

14 Claims, 14 Drawing Sheets

(52) U.S. Cl.
CPC .... *H02M 3/33507* (2013.01); *H02M 3/33523* (2013.01); *H02M 2001/0019* (2013.01)

(56) References Cited

U.S. PATENT DOCUMENTS

| | | | |
|---|---|---|---|
| 2012/0013321 A1* | 1/2012 | Huang | H02M 3/33523 323/282 |
| 2013/0147384 A1 | 6/2013 | Wu | |
| 2013/0223108 A1* | 8/2013 | Xu | H02M 3/33507 363/21.17 |
| 2014/0117964 A1* | 5/2014 | Walters | H05B 33/0815 323/299 |
| 2014/0265932 A1* | 9/2014 | Greenwood | H05B 37/02 315/307 |
| 2015/0028761 A1* | 1/2015 | Vonach | H05B 33/0815 315/201 |

FOREIGN PATENT DOCUMENTS

| | | |
|---|---|---|
| CN | 202183897 U | 4/2012 |
| CN | 102570837 A | 7/2012 |
| CN | 202310230 U | 7/2012 |
| JP | 2010092844 | 4/2010 |
| TW | 201334628 | 8/2013 |

\* cited by examiner

US 9,781,804 B2

LIGHT REGULATING APPARATUS WITH FEED FORWARD COMPENSATION AND LIGHT REGULATING METHOD THEREOF

RELATED APPLICATIONS

This application claims priority to China Application Serial Number 201310673948.9 filed Dec. 11, 2013, which is herein incorporated by reference.

BACKGROUND

Technical Disclosure

The present disclosure relates to a light regulating apparatus and a light regulating method thereof. More particularly, the present disclosure relates to a light regulating apparatus and a light regulating method thereof for regulating a load current.

Description of Related Art

In recent years, since a manufacture technology of light emitting diode (LED) has been developed, a luminance and an efficiency of LED have increased greatly. Therefore, LED has replaced incandescent lamp as a new light component and has been applied in various devices, e.g., household lighting device, handheld lighting device, automotive lighting device, backlight source of liquid crystal panel, traffic light, etc. However, since the characteristic of LED is different from the characteristic of incandescent lamp, the light regulating circuit applied for LED is different from the light regulating circuit applied for incandescent lamp.

In conventional technology, in order to drive a load circuit with several LED series, it is usually to couple a voltage regulator or a current regulator to the load circuit so as to stabilize an operating current of LED series by the characteristic of constant current of the voltage regulator or the current regulator. For example, a converter is utilized to convert a direct voltage or an alternating voltage into a constant direct voltage and an operating voltage applied to the load circuit is generated by providing the constant direct voltage to the voltage regulator or the current regulator.

FIG. 1 depicts a conventional light-regulating apparatus. As shown in FIG. 1, in order to rapidly regulate a current magnitude or a voltage magnitude outputted from the current regulator or the voltage regulator, the conventional approach is to couple capacitors C1-Cn to an output terminal of the current regulator or the voltage regulator in parallel, in which capacitors C1-Cn are coupled to the output terminal of the current regulator or the voltage regulator through switch components T1-Tn, respectively. First, capacitors C1-Cn are charged to a pre-determined voltage through an output voltage Vo of the current regulator or the voltage regulator. Next, capacitors C1-Cn are selected by controlling each switch component to be turned on or turn off so as to output a rated operating voltage to the load circuit (e.g., LED). Accordingly, rapidly regulating the current magnitude of LED is implemented.

However, the disadvantage of the aforementioned approach is that regulating the current magnitude is inflexible. By coupling one capacitor to the current regulator or the voltage regulator to get one current magnitude, the current magnitude applied to LED is difficult to be regulated continuously.

Moreover, another conventional approach for regulating the current magnitude of LED is to couple a linear regulator to LED series in series and regulate the current through LED series by regulating the linear regulator. However, in this approach, the conversion efficiency of the converter is bad.

SUMMARY

In order to solve the above problems, one aspect of the present disclosure is to provide a light regulating apparatus. A load current can be rapidly regulated by regulating an operating frequency or a duty cycle of a converter according to a feed forward compensation signal and a regulation signal, such that light can be rapidly regulated. Additionally, conversion efficiency of the converter can be enhanced.

One aspect of the present disclosure is to provide a light regulating apparatus. The light regulating apparatus includes a converter, a load circuit and a controller. The converter is configured to generate a load current signal according to a control signal. The load circuit is driven by the load current signal. The controller is configured to generate the control signal. The converter includes an error computation unit, a regulation unit, a feed forward compensation unit and an addition unit. The error computation unit is configured to generate a first error signal according to a reference current signal and a feedback signal. The regulation unit is configured to generate a regulation signal according to the first error signal. The feed forward compensation unit is configured to generate a feed forward compensation signal according to the reference current signal. The addition unit is configured to generate the control signal according to the regulation signal and the feed forward compensation signal.

Another aspect of the present disclosure is to provide a light regulating method. The light regulating method includes: generating a feed forward compensation signal according to a reference current signal; generating a first error signal according to the reference current signal and a feedback signal; generating a regulation signal according to the first error signal; generating a control signal for controlling a converter to output a load current signal according to the feed forward compensation signal and the regulation signal, wherein the load current signal is configured to drive a load circuit; and regulating the load current signal according to the control signal when the reference current signal is changed.

It is to be understood that both the foregoing general description and the following detailed description are by examples, and are intended to provide further explanation of the invention as claimed.

BRIEF DESCRIPTION OF THE DRAWINGS

The disclosure may be more fully understood by reading the following detailed description of the embodiment, with reference made to the accompanying drawings as follows.

DETAILED DESCRIPTION

Figure 1:
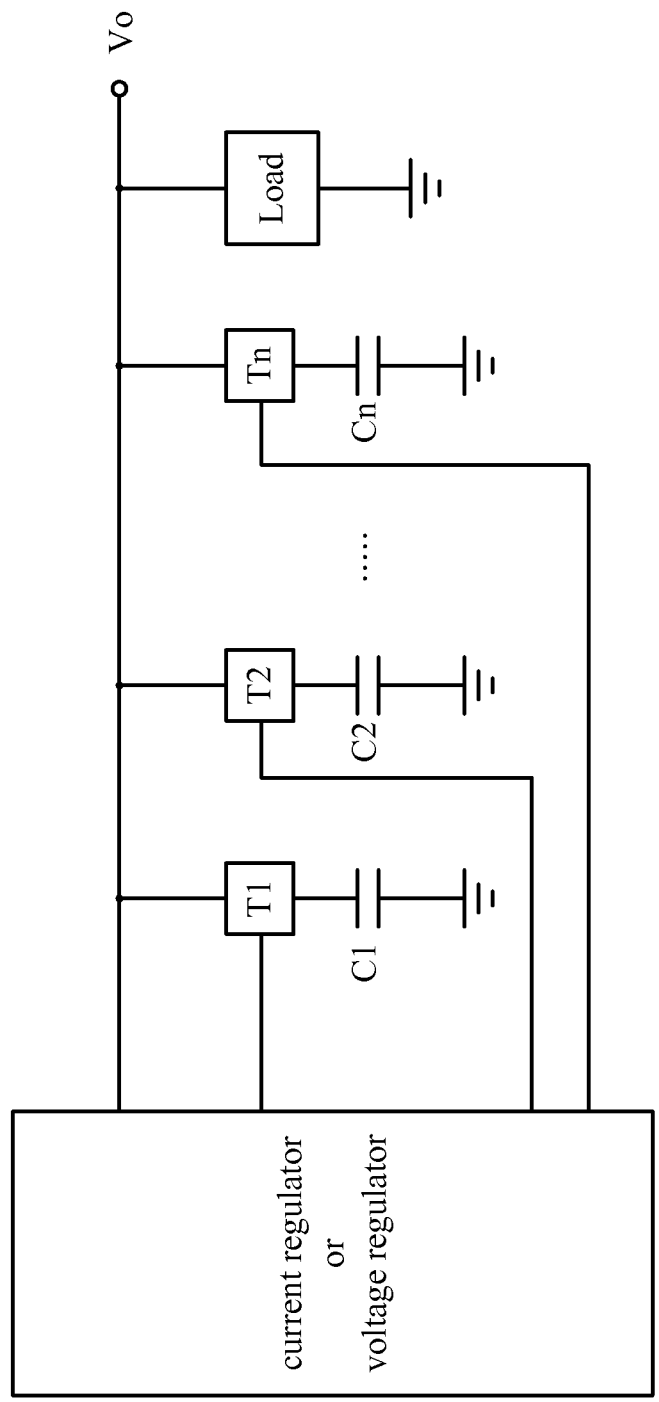
FIG. 1 depicts a conventional light-regulating apparatus.

Reference will now be made in detail to the present embodiments of the disclosure, examples of which are illustrated in the accompanying drawings. Wherever possible, the same reference numbers are used in the drawings and the description to refer to the same or like parts.

Figure 2:
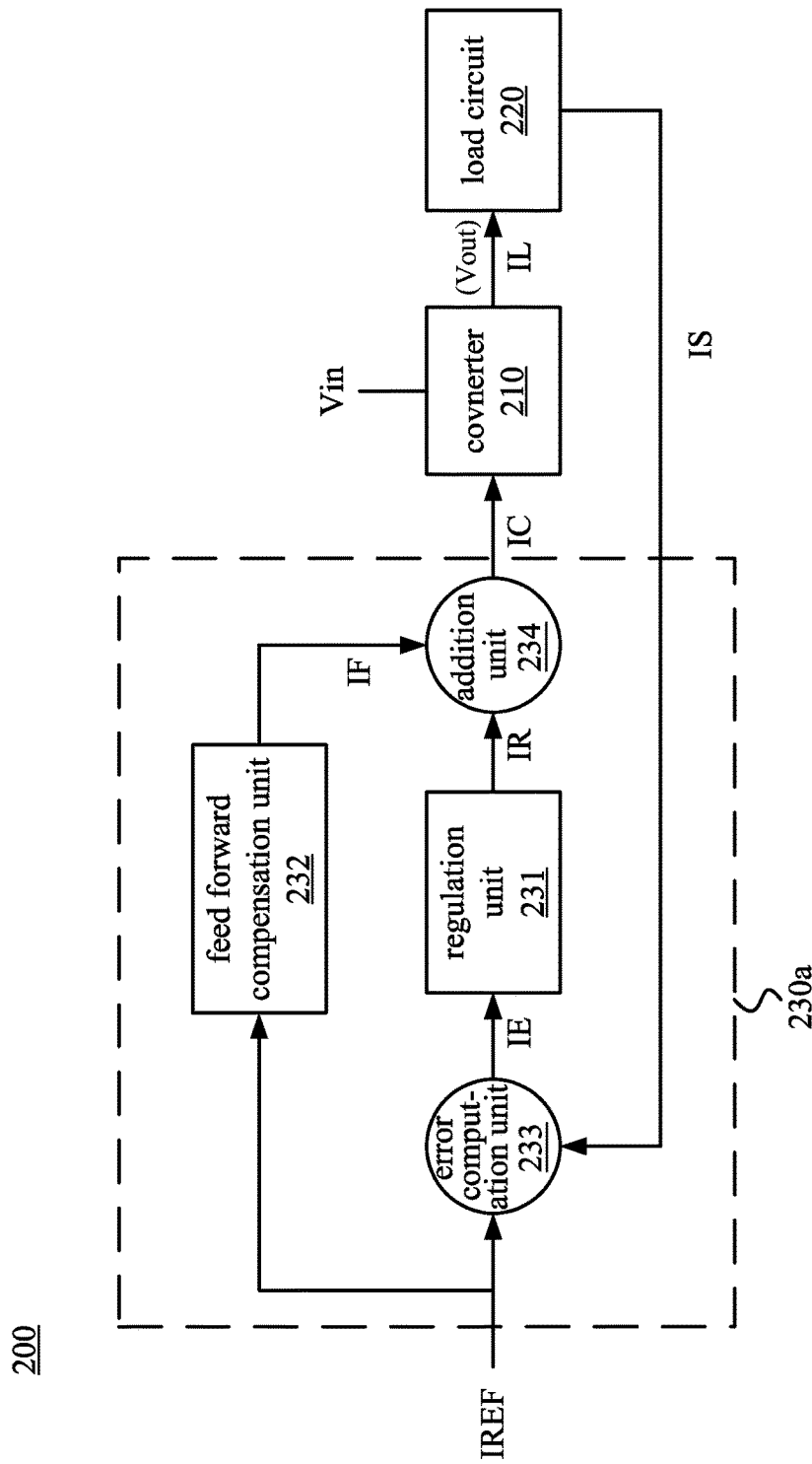
FIG. 2 depicts a schematic diagram of a light-regulating apparatus according to a first embodiment of the present disclosure.

FIG. 2 depicts a schematic diagram of a light-regulating apparatus 200 according to a first embodiment of the present disclosure. As shown in FIG. 2, the light-regulating apparatus 200 includes a converter 210, a load circuit 220 and a controller 230a. The converter 210 receives an input voltage Vin, and transfers the input voltage Vin into an output voltage Vout. Next, the converter 210 provides the output voltage Vout to the load circuit 220. A load current signal IL corresponding to the output voltage Vout is provided to the load circuit 220. The load circuit 220 is driven by the load current signal IL for emitting light. A luminance of load circuit 220 is regulated according to a magnitude of the load current signal IL. The load circuit 220 may include at least one light emitting component, e.g., a light emitting diode (LED), an LED series, or a laser component.

Moreover, the controller 230a detects a feedback signal IS corresponding to the load current signal IL. Next, the controller 230a generates a control signal IC according to the feedback signal IS and the reference current signal IREF, and transmits the control signal IC to the converter 210. The control signal IC is configured to regulate the load current signal IL outputted from the converter 210 to a setting current value. In other words, the control signal IC is configured to regulate a luminance of the load circuit 220. It is noted that the feedback signal IS which is corresponding to the load current signal IL may be obtained by detecting a effective value, a peak value, or a rectified average value of a primary current of a transformer (not shown in the figure) in the converter 210, or by detecting a effective value, a peak value, or a rectified average value of a secondary current of the transformer in the converter 210, or by detecting a current signal of the load circuit 220, but the present embodiment is not limited thereto.

The controller 230a includes a regulation unit 231, a feed forward compensation unit 232, an error computation unit 233 and an addition unit 234. The error computation unit 233 is configured to generate a first error signal IE according to the feedback signal IS and the reference current signal IREF. The regulation unit 231 is configured to generate a regulation signal IR according to the first error signal IE. The feed forward compensation unit 232 is configured to generate a feed forward compensation signal IF according to the reference current signal IREF. The addition unit 234 is configured to generate the control signal IC according to the feed forward compensation signal IF and the regulation signal IR. In other words, the control signal IC is determined by the regulation signal IR generated from the regulation unit 231 and the feed forward compensation signal IF generated from the feed forward compensation unit 232. Furthermore, the regulation signal IR and the feed forward compensation signal IF may be pulse frequency modulation (PFM) signals or pulse width modulation (PWM) signals. Accordingly, the control signal IC generated from the controller 230a may regulate the load current signal IL outputted from the converter 210 to a setting current value by regulating an operating frequency or a duty cycle of the converter 210, but the present embodiment is not limited thereto. In other embodiments, the controller 230a may be a digital controller. The digital controller receives the reference current signal IREF and the feedback signal IS to generate the control signal IC to the converter 210. The control signal IC is configured to regulate the load current signal IL outputted from the converter 210 to a setting current value.

Figure 3:
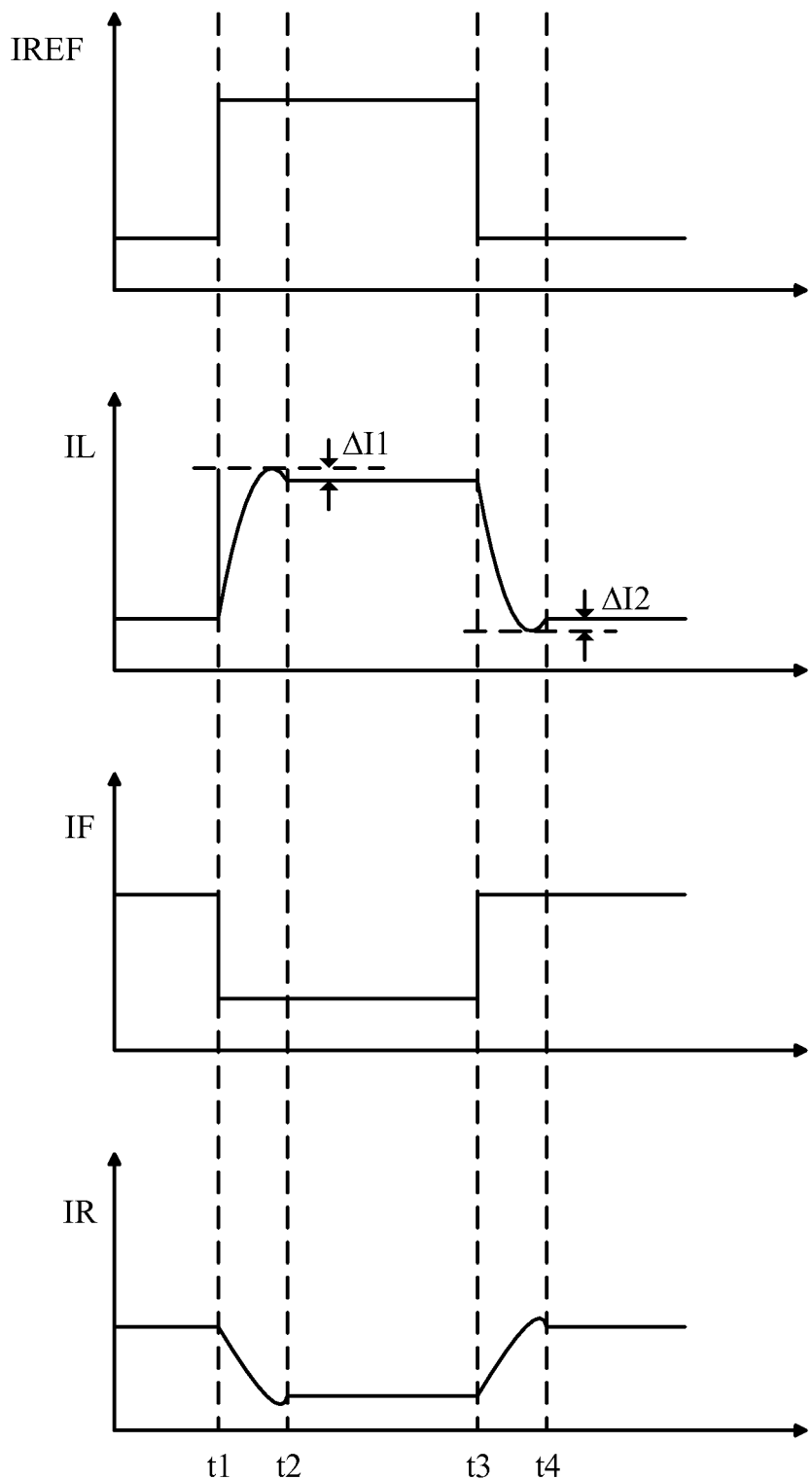
FIG. 3 depicts a timing diagram for controlling a light-regulating apparatus according to a first embodiment of the present disclosure.

Reference is made to FIG. 2 and FIG. 3. FIG. 3 depicts a timing diagram for controlling a light-regulating apparatus according to a first embodiment of the present disclosure. As shown in FIG. 3, when the reference current signal IREF is changed (e.g., at time t1 or at time t3 in FIG. 3), the light-regulating apparatus 200 starts to execute a light-regulating procedure. The load current signal IL is regulated to a setting current value (e.g., a stable value of load current signal) at time t3 or time t4. In the present embodiment, a stable value of load current signal is any value between 90% and 110% of an operating load current signal corresponding to the reference current signal IREF. In order to clearly describe the present embodiment, the operations of the light-regulating apparatus 200 in FIG. 2 are described with a control timing diagram of FIG. 3, but the operations of the light-regulating apparatus 200 is not limited by the embodiment of FIG. 3.

In the present embodiment, it is noted that the converter 210 may be a resonant converter. The regulation signal IR and the feed forward compensation signal IF may be pulse frequency modulation signals configured to change an operating frequency of the converter 210, but the present embodiment is not limited thereto. In other embodiments, the converter 230 may be a half bridge converter, a full bridge converter, a flyback converter, etc. The regulation signal IR and the feed forward compensation signal IF may be pulse width modulation signals configured to change a duty cycle of the converter 210. Since the reference current signal IREF is larger than the feedback signal IS, the error computation unit 233 may generate the first error signal IE according to the difference between the reference current signal IREF and the feedback signal IS. The regulation unit 231 receives the first error signal IE so as to generate the regulation signal IR. The regulation signal IR may be a specific pulse width modulation signal corresponding to the present reference current signal IREF and the present feedback signal IS. At the same time, the feed forward compensation unit 232 receives the reference current signal IREF so as to generate the feed forward compensation signal IF. The feed forward compensation signal IF may be a specific pulse width modulation signal corresponding to the present reference current signal IREF. Accordingly, the control signal IC outputted from the addition unit 234 is configured to gradually increase a duty cycle of the converter 210 by increasing the values of the regulation signal IR and the feed forward compensation signal IF, such that the load current signal IL outputted from the converter 210 is gradually increased.

In the present embodiment, for example, the converter 210 is a resonant converter. The regulation signal IR and the feed forward compensation signal IF are frequency modulation signals configured to change an operating frequency of the converter 210. At time t1, the reference current signal IREF rises (i.e., the reference current signal is changed) that represents the load current signal IL will be increased, i.e., a luminance of the load circuit 220 will be increased. At this time, the reference current signal IREF is larger than the feedback signal IS. The error computation unit 233 generates the first error signal IE according to the difference between the reference current signal IREF and the feedback signal IS. The regulation unit 231 receives the first error signal IE and generates the regulation signal IR according to the first error signal IE. The regulation signal IR may correspond to a specific operating frequency of the present reference current signal IREF and the feedback signal IS. At the same time (i.e., at time t1), the feed forward compensation unit 232 receives the reference current signal IREF and generates the feed forward compensation signal IF according to the reference current signal IREF. The feed forward compensation signal IF may correspond to a specific operating frequency of the present reference current signal IREF. The control signal IC outputted from the addition unit 234 may gradually decrease an operating frequency of the converter 210 by decreasing values of the regulation signal IR and the feed forward compensation signal IF. Accordingly, the load current signal IL outputted from the converter 210 is increased gradually until the load current signal IL reaches to a setting current value at time t2, that is, the light-regulating apparatus 200 is stable. In the present embodiment, the setting current value is a current value which sets the load circuit 220 to emit light stably. In the present embodiment, the setting current value may be a stable value of load current signal. The stable value of load current signal is any value between 90% and 110% of the operating load current signal corresponding to the reference current signal IREF, but the present embodiment is not limited thereto. Since the feedback signal IS is related to the load current signal IL, the generation mechanism of the regulation signal IR is a passive control mechanism. In other words, when the load current signal IL is regulated (e.g., a period between time t1 and time t2), the regulation signal IR varies with the load current signal IL.

On the other hand, when the reference current signal rises at time t1, the feed forward compensation unit 232 directly generates the feed forward compensation current IF according to the changed reference current signal IREF. Furthermore, the feed forward compensation current IF may be a specific operating frequency corresponding to the present reference current signal IREF. An operating frequency of the converter 210 may be directly changed by the feed forward compensation signal IF such that the converter 210 increase the load current signal IL until the load current signal IL is stable, that is, the load current signal IL reaches to a setting current value (e.g., at time t2). Since the feed forward compensation unit 232 does not generate the feed forward compensation current IF according to the feedback signal IS (i.e., the load current signal IL), the generation mechanism of the feed forward compensation current IF is an active control mechanism. In other words, when the load current signal IL is regulated (e.g., a period between time t1 and time2), the feed forward compensation current IF remains unvaried.

Similarly, in FIG. 3, at time t3, the reference current signal IREF falls (i.e., the reference current signal is changed) that represents the load current signal IL will be decreased, i.e., a luminance of the load circuit 220 will be decreased. At this time, the reference current signal IREF is smaller than the feedback signal IS. The error computation unit 233 generates the first error signal IE according to the difference between the reference current signal IREF and the feedback signal IS. The regulation unit 231 receives the first error signal IE and generates the regulation signal IR according to the first error signal IE. At the same time, the feed forward compensation unit 232 receives the reference current signal IREF and generates the feed forward compensation signal IF according to the reference current signal IREF. By increasing the values of the regulation signal IR and the feed forward compensation signal IF, the control signal IC outputted from the addition unit 234 may gradually increase the operating frequency of the converter 210. Accordingly, the load current signal IL outputted from the converter 210 is decreased gradually until the load current signal IL reaches to a setting current value (i.e., the stable load current signal value) at time t4, that is, the light-regulating apparatus 200 is stable. In the present embodiment, the setting current value is a current value which sets the load circuit 220 to emit light stably. The setting current value may be a stable value of load current signal. The stable value of load current signal is any value between 90% and 110% of an operating load current signal IL corresponding to the reference current signal IREF, but the present embodiment is not limited thereto. Moreover, the feed forward compensation unit 232 generates the feed forward compensation signal IF according to the decreased reference current signal IREF for changing an operating frequency of the converter 210 such that the converter 210 decreases the load current signal IL until the load current signal IL is stable, i.e., the load current signal IL reaches to a setting current signal (e.g., at time t4).

Specifically, the light-regulating apparatus 200 directly regulates the converter 210 (e.g., changing an operating frequency of the converter 210) by the feed forward compensation current IF generated from the feed forward compensation unit 232 according to the reference current signal IREF. In addition, the light-regulating apparatus 200 gradually regulates the converter 210 (e.g., changing an operating frequency of the converter 210) by the regulation signal IR generated from the regulation unit 231 according to the first error signal IE, in which the first error signal IE is generated from the error computation unit 233 by comparing the reference current signal IREF with the feedback signal IS. Accordingly, the load current signal IL is regulated so as to regulate a luminance of the load circuit 220.

In brief, the light-regulating apparatus 200 regulates the load current signal IL by both the feed forward compensation signal IF and the regulation signal IR. Since generating the feed forward compensation signal IF is a feed forward control, an offset amount (e.g., a varied amount of the load current signal IL) may be predicted previously and a compensation amount (e.g., an operating frequency of the converter 210) may be provided in advanced. Therefore, an output signal (e.g., the load current signal IL) may be corrected directly with an input signal (e.g., the reference current signal IREF) rather than an error signal generated from the input signal and the output signal. Accordingly, the load current signal IL can be regulated rapidly, that is, a luminance of the load circuit 220 can be regulated rapidly.

Furthermore, in the present embodiment, the error computation unit 233 is configured to receive the feedback signal IS and the reference current signal IREF and compare the feedback signal IS with the reference current signal IREF for generating the error signal IE to the regulation unit 231. The regulation unit 231 generates the corresponding regulation signal IR according to the error signal IE so as to regulate the converter 210. The addition unit 234 is configured to add the feed forward compensation signal IF and the regulation signal IR for generating the control signal IC so as to regulate an operating frequency or a duty cycle of the converter 210. In other words, in the present embodiment, the control signal IC is determined by both the feed forward compensation signal IF and the regulation signal IR not only in a period of light regulation (e.g., a period between time t1 and time t2 or a period between time t3 and t4) but also in a period of stabilizing the load current signal IL (e.g., a period between time t2 and time t3).

In a light regulation process (e.g., a period between time t1 and time t2 or a period between time t3 and time t4), since the converter 210 is regulated by both the regulation signal IR and the feed forward compensation signal IF, the regulated load current signal IL is slightly over-regulated. For example, in a period between time t1 and time t2, an over-regulated amount ΔI1 is generated when the load current signal IL is increased beyond a setting current value; or in a period between time t3 and time t4, an over-regulated amount ΔI2 is generated when the load current signal IL is decreased beyond a setting current value. However, the aforementioned condition may not affect operation and effect of the circuit.

Figure 4:
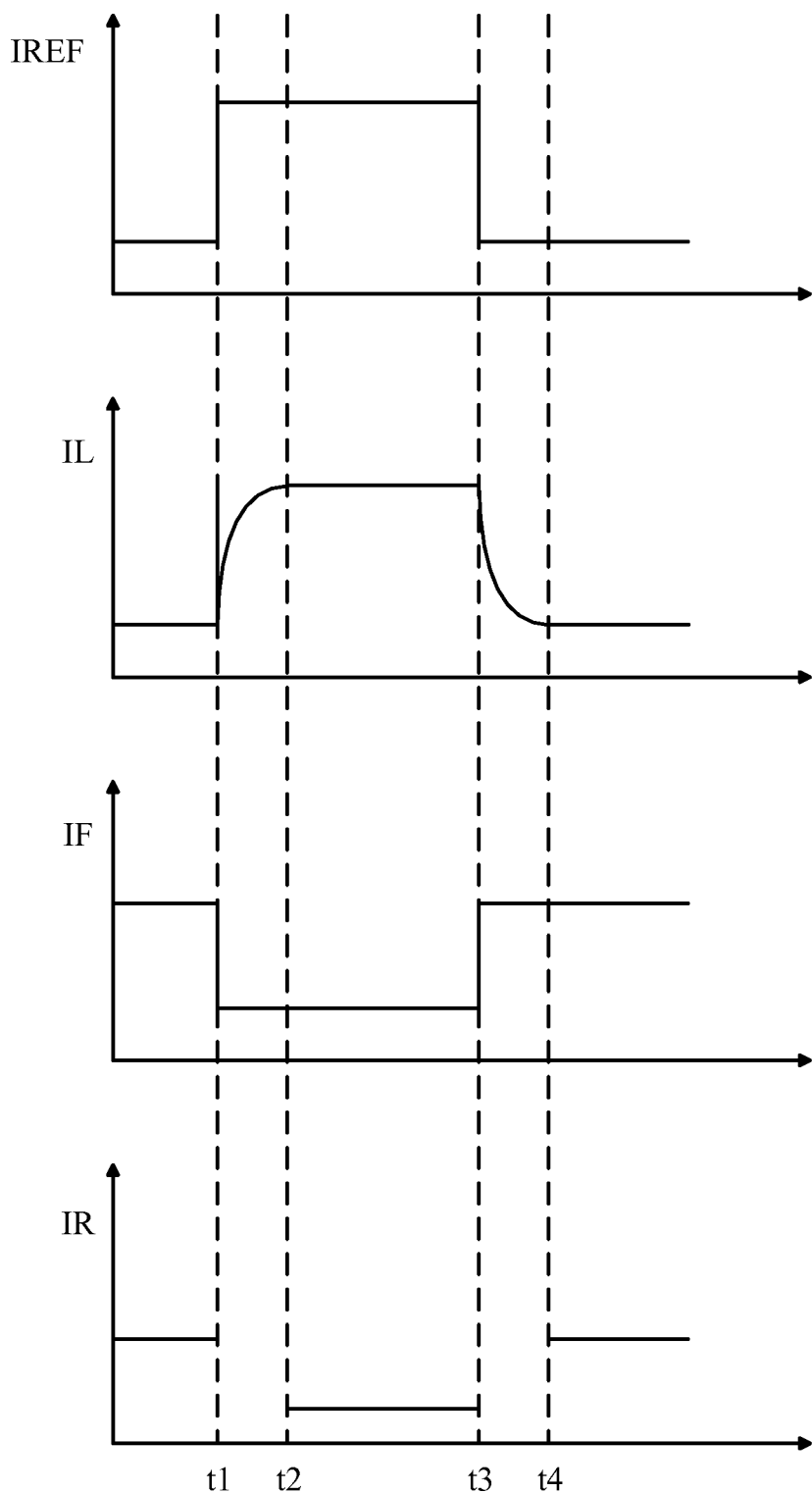
FIG. 4 depicts a timing diagram for controlling a light-regulating apparatus according to a second embodiment of the present disclosure.

FIG. 4 depicts a timing diagram for controlling a light regulating apparatus according to a second embodiment of the present disclosure. In the present embodiment, the converter 210 shown in FIG. 2 may be a resonant converter, the regulation signal IR and the feed forward compensation signal IF may be frequency modulation signals configured to change an operating frequency of the converter 210, but the present embodiment is not limited thereto.

In the present embodiment, when the reference current IREF is changed (e.g., at time t1 or at time t3), the light-regulating apparatus 200 halts to output the regulation signal IR until the load current signal IL reaches to a setting current value. In other words, when it is at time t2 or time t4, the regulation unit 231 restarts to output the regulation signal IR. The load current signal IL may be a stable value of load current signal (e.g., any value between 90% and 110% of an operating load current signal corresponding to the reference current signal IREF.), but the present embodiment is not limited thereto. In other words, in a light regulation process (e.g., a period between time t1 and time t2 or a period between time t3 and time t4), the control signal IC is only determined by the feed forward compensation signal IF. In other words, only the feed forward compensation signal IF regulates the converter 320 to change the load current signal IL during the light regulation process.

The feed forward compensation unit 232 directly generates the feed forward compensation signal IF to the converter 210 according to the corresponding varied reference current signal IREF. In other words, the feed forward compensation unit 232 don't have to wait the feedback signal IS being changed to generate the feed forward compensation signal IF. Accordingly, during the light regulation process, the control signal IC which is determined only by the feed forward compensation signal IF can rapidly regulate the load current signal IL during the light regulation process. Moreover, when the load current signal IL is stable, the converter 210 is regulated by both the feed forward compensation signal IF and the regulation signal IR. Since the generation way of the regulation signal IR is a feedback control mechanism, the system can be stabilized. Accordingly, a luminance of the load current 22 can be rapidly regulated by the aforementioned light-regulating method. In addition, a condition of over-regulating the load current signal IL in FIG. 3 can be improved.

Figure 5:
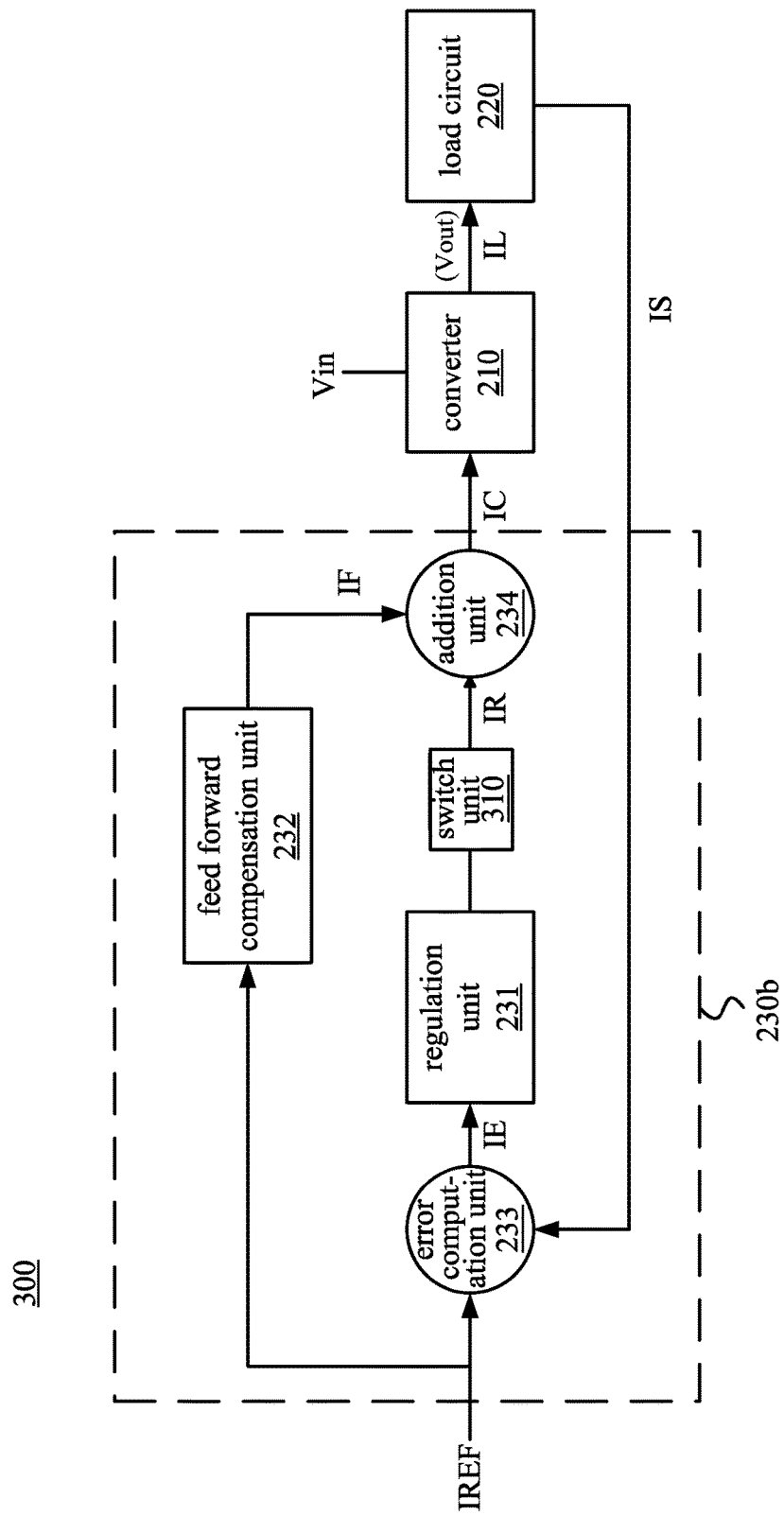
FIG. 5 depicts a schematic diagram of a light-regulating apparatus according to a second embodiment of the present disclosure.

FIG. 5 depicts a schematic diagram of a light-regulating apparatus 300 according to a second embodiment of the present disclosure. The light-regulating apparatus 300 in FIG. 5 is one embodiment using the light-regulating method of FIG. 4, but the method of FIG. 4 is not limited by the embodiment in FIG. 5. The light-regulating apparatus 300 includes the converter 210, the load circuit 220 and a controller 230b. The operations and the connections of the light-regulating apparatus 300 are similar to those in aforementioned embodiment in FIG. 2, and thus they are not further detailed herein. Similarly, the regulation signal IR and the feed forward compensation signal IF may be pulse frequency modulation signals or pulse width modulation signals. Accordingly, the control signal IC determined by the regulation IR and the feed forward compensation signal IF may regulate the load current signal IL outputted from the converter 210 to a setting current value by regulating an operating frequency or a duty cycle of the converter 210, but the present embodiment is not limited thereto.

In the present embodiment, besides the regulation unit 231, the feed forward compensation unit 232, the error computation unit 233 and the addition unit 234, the controller 230b includes a switch unit 310. The switch unit 310 is electrically coupled between the regulation unit 231 and the addition unit 234.

When the reference current signal IREF is changed, the controller 230b controls the switch unit 310 to be cut off such that the regulation unit 231 is unable to output the regulation signal IR to the addition unit 234. At this time, the control signal IC is only determined by the feed forward compensation signal IF. When the load current signal IL reaches to a setting current signal, the controller 230a controls the switch unit 310 to be conducted such that the regulation unit 231 restarts to output the regulation signal IR to the addition unit 234. At this time, the control signal IC is determined by both the feed forward compensation signal IF and the regulation signal IR. Accordingly, the light-regulating method of FIG. 4 can be implemented by controlling the switch unit 310.

Figure 6:
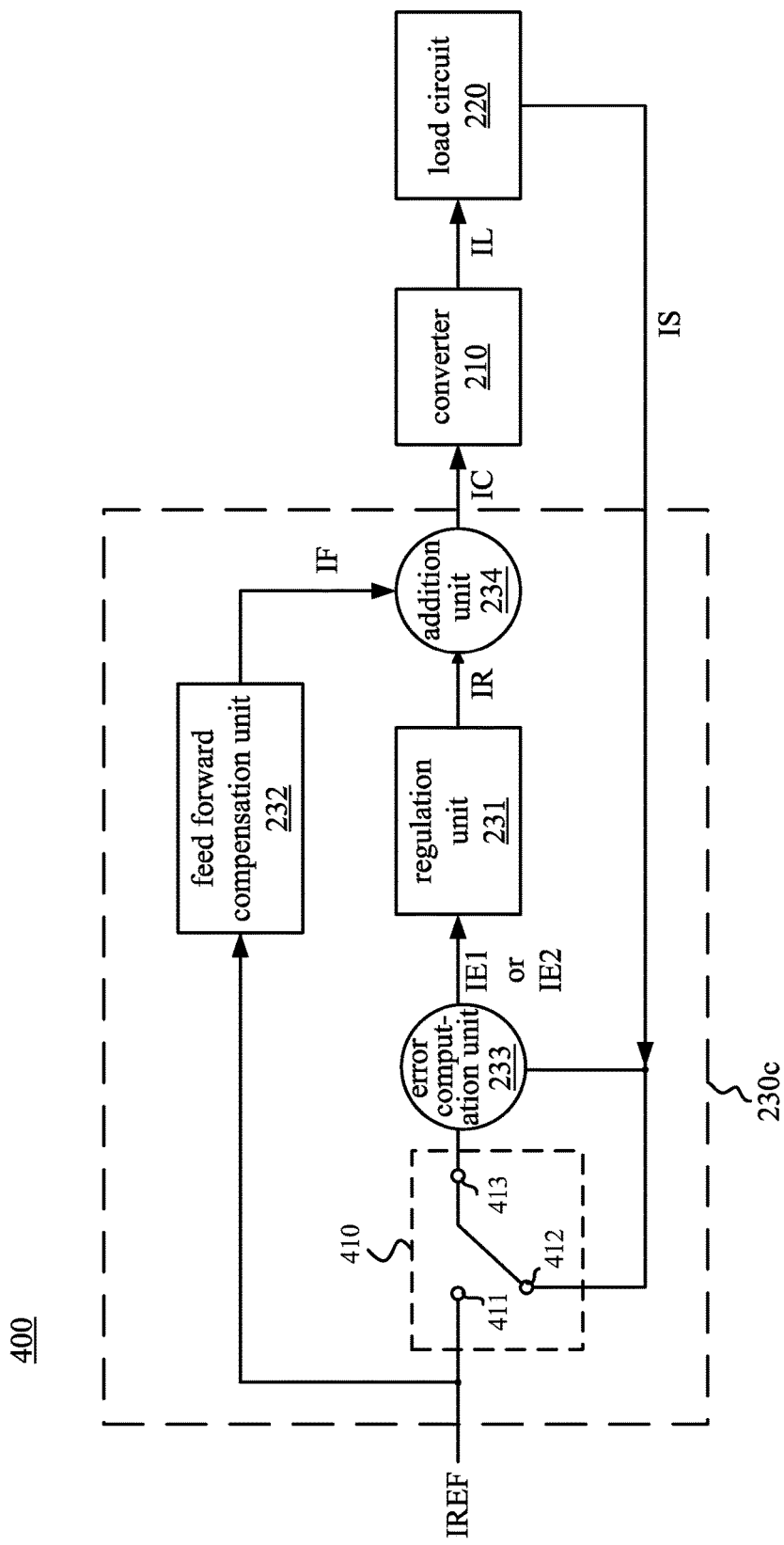
FIG. 6 depicts a schematic diagram of a light-regulating apparatus according to a third embodiment of the present disclosure.

FIG. 6 depicts a schematic diagram of a light-regulating apparatus 400 according to a third embodiment of the present disclosure. The light-regulating apparatus 400 includes the converter 210, the load circuit 220 and a controller 230c. The operations and the connections of the light-regulating apparatus 400 are similar to those in aforementioned embodiment in FIG. 2 or in FIG. 5, and thus they are not further detailed herein. Similarly, the regulation signal IR and the feed forward compensation signal IF may be pulse frequency modulation signals or pulse width modulation signals. Accordingly, the control signal IC determined by the regulation IR and the feed forward compensation signal IF may regulate the load current signal IL outputted from the converter 210 to a setting current value by regulating an operating frequency or a duty cycle of the converter 210, but the present embodiment is not limited thereto.

In the present embodiment, besides the regulation unit 231, the feed forward compensation unit 232, the error computation unit 233 and the addition unit 234, the controller 230c includes a selection unit 410. The selection unit 410 includes a first terminal 411, a second terminal 412 and a third terminal 413. The first terminal 411 is configured to receive the reference current signal IREF. The second terminal 412 is configured to receive the feedback signal IS. The third terminal 413 is electrically coupled to the error computation unit 233. The selection unit 410 may select one of the first terminal 411 and the second terminal 412 to be electrically coupled to the third terminal 413 so as to selectively output the reference current signal IREF or the feedback signal IS to the error computation unit 233.

Figure 7:
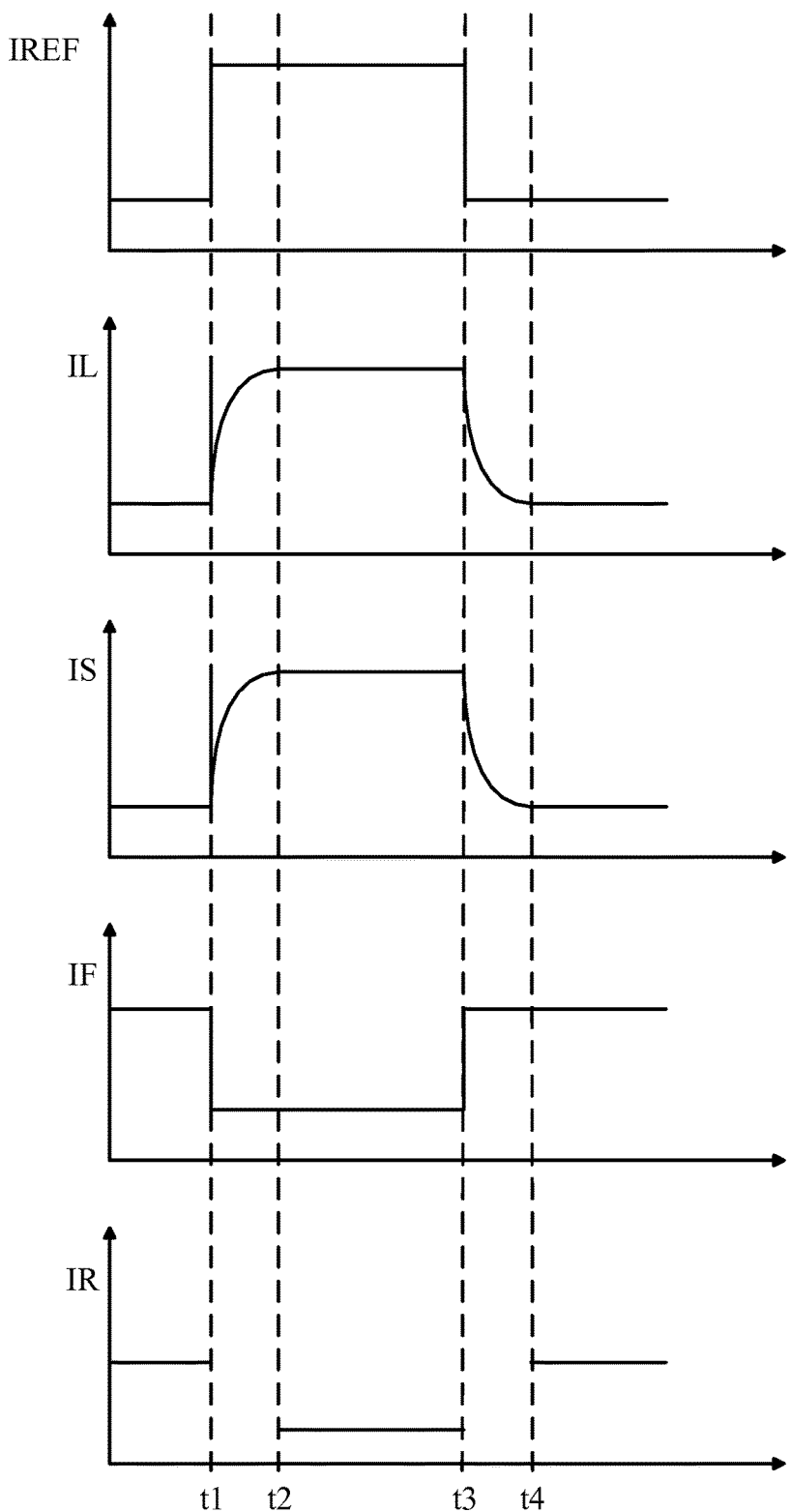
FIG. 7 depicts a timing diagram for controlling a light-regulating apparatus according to a third embodiment of the present disclosure.

FIG. 7 depicts a timing diagram for controlling a light-regulating apparatus according to a third embodiment of the present disclosure. Similarly, in the present embodiment, the converter 210 may be a resonant converter, and the regulation signal IR and the feed forward compensation signal IF may be frequency modulation signals configured to change an operation frequency of the converter 210, but the present embodiment is not limited thereto. In the present embodiment, it is noted that the feedback signal IS is obtained by directly detecting a value of the load current signal IL, but the present embodiment is not limited thereto.

When it is at time t2 or at time t4, that is, when the load current signal IL reaches to a setting current value (e.g., any value between 90% and 110% of an operating load current signal IL corresponding to the reference current signal IREF), the selection unit 410 switches the first terminal 411 to be electrically coupled to the third terminal 413. In other words, at this time, the selection unit 410 receives the reference current signal IREF through the first terminal 411 and transmits the reference current signal IREF to the error computation unit 233 through the third terminal 413. The error computation unit 233 compares the reference current signal IREF with the feedback signal IS and generates the first error signal IE1 to the regulation unit 231. The regulation unit 231 generates the regulation signal IR to the addition unit 234 according to the first error signal IE1. The addition unit 234 receivers the regulation signal IR and the feed forward compensation signal IF generated from the feed forward compensation unit 232 and generates the control signal IC which is configured to regulate the converter 210.

When it is at time t1 or at time t3, that is, when the reference current signal IREF is changed, the selection unit 410 switches the second terminal 412 to be electrically coupled to the third terminal 413. In other words, at this time, the selection unit 410 receives the feedback signal IS through the second terminal 412 and transmits the feedback signal IS to the error computation unit 233 through the third terminal 413. The error computation unit 233 compares the feedback signal IS with the feedback signal IS and generates the second error signal IE2 to the regulation unit 231. Since the second error signal IR approximately approaches to zero, the regulation signal IR generated from the regulation unit 231 substantially fails to regulate the converter 210. Accordingly, outputting the reference current signal IREF or the feedback signal IS to the error computation unit 233 by controlling the selection unit 410 to switch the first terminal 411 or the second terminal 412 to be electrically coupled the third terminal 413, that is, generating the regulation signal IR by the first error signal IE1 or the second error signal IE2 also can rapidly regulate a luminance of the load circuit 220 and improve a condition of over regulating the load current signal IL in FIG. 3. In the present embodiment, the selection unit 410 may be a hardware switch component or be implemented by software, but the present embodiment is not limited thereto.

Figure 8A:
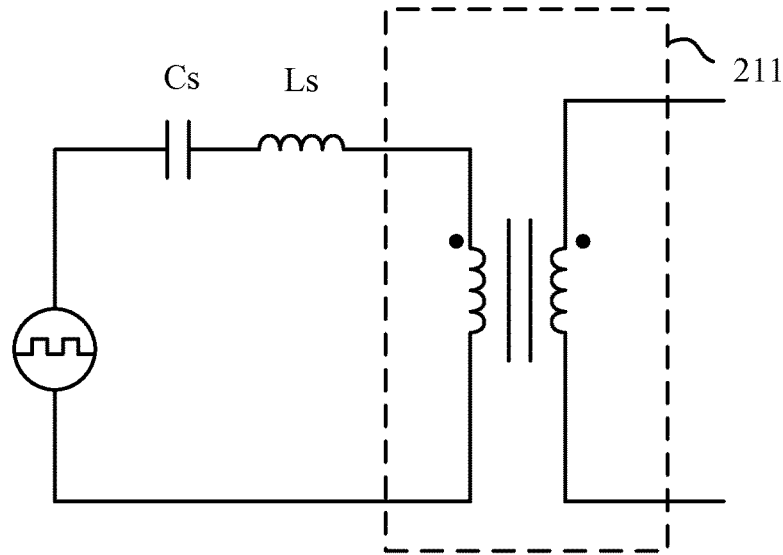
FIG. 8a depicts a schematic diagram of a converter according to one embodiment of the present disclosure.
Figure 8B:
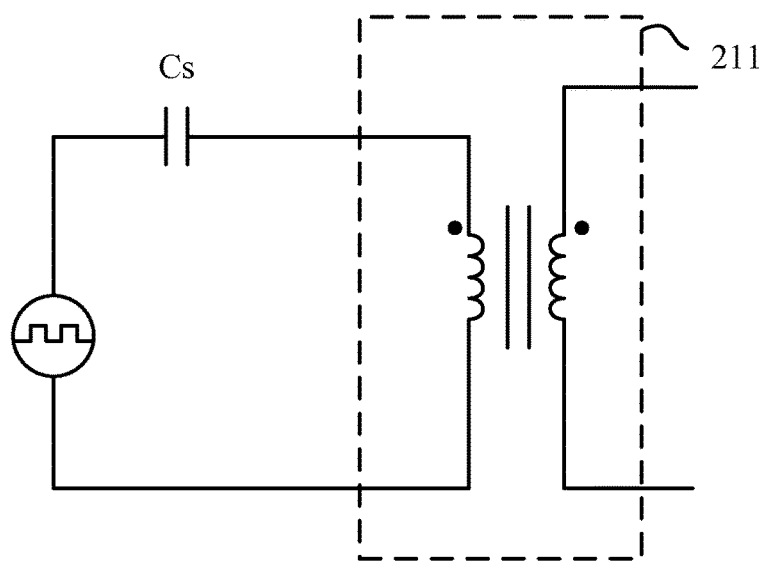
FIG. 8b depicts a schematic diagram of a converter according to another embodiment of the present disclosure.

Reference is made to FIG. 8a and FIG. 8b. FIG. 8a depicts a schematic diagram of a converter 210a according to one embodiment of the present disclosure. FIG. 8b depicts a schematic diagram of a converter 210b according to another embodiment of the present disclosure. As shown in FIG. 8a, the converter 210a is an LLC resonant converter composed of a resonant capacitor Cs, a resonant inductor Ls and a transformer 211. As shown in FIG. 8b, the converter 210b is an LC resonant converter composed of a resonant capacitor Cs and a transformer 211. The converter 210 of FIG. 2, FIG. 5 and FIG. 6 may be the converter 210a of FIG. 8a, the converter 210b of FIG. 8b, or other resonant converters, but the present disclosure is not limited thereto.

Figure 9A:
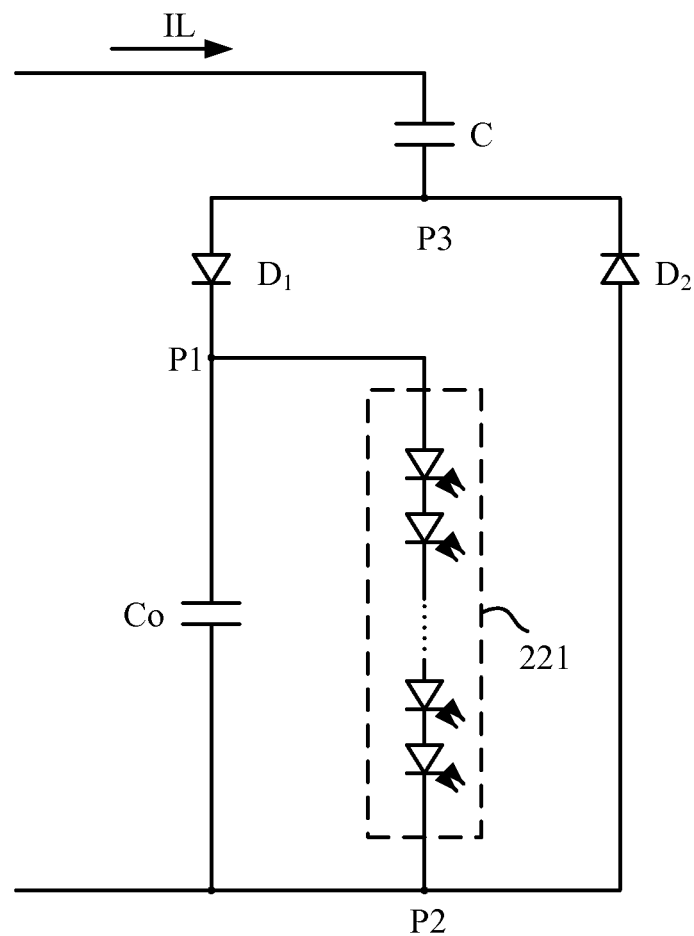
FIG. 9a depicts a schematic diagram of a load circuit according to one embodiment of the present disclosure.

FIG. 9a depicts a schematic diagram of a load circuit 220a according to one embodiment of the present disclosure. As shown in FIG. 9a, the load circuit 220a takes a light emitting diode (LED) series as a load. The load circuit 220a includes an LED series 221, a filter capacitor Co, a balanced capacitor C, a diode D1 and a diode D2. The LED series 221 is coupled to the filter capacitor Co in parallel. A cathode of the diode D1 is coupled to an anode of the LED series 221 through a terminal P1. An anode of the diode D2 is coupled to a cathode of the LED series 211 through a terminal P2. In addition, an anode of the diode D1 is coupled to a cathode of the diode D2 through a terminal P3. Accordingly, the load current signal IL will be rectified by the diode D1 before driving the LED series 221.

Figure 9B:
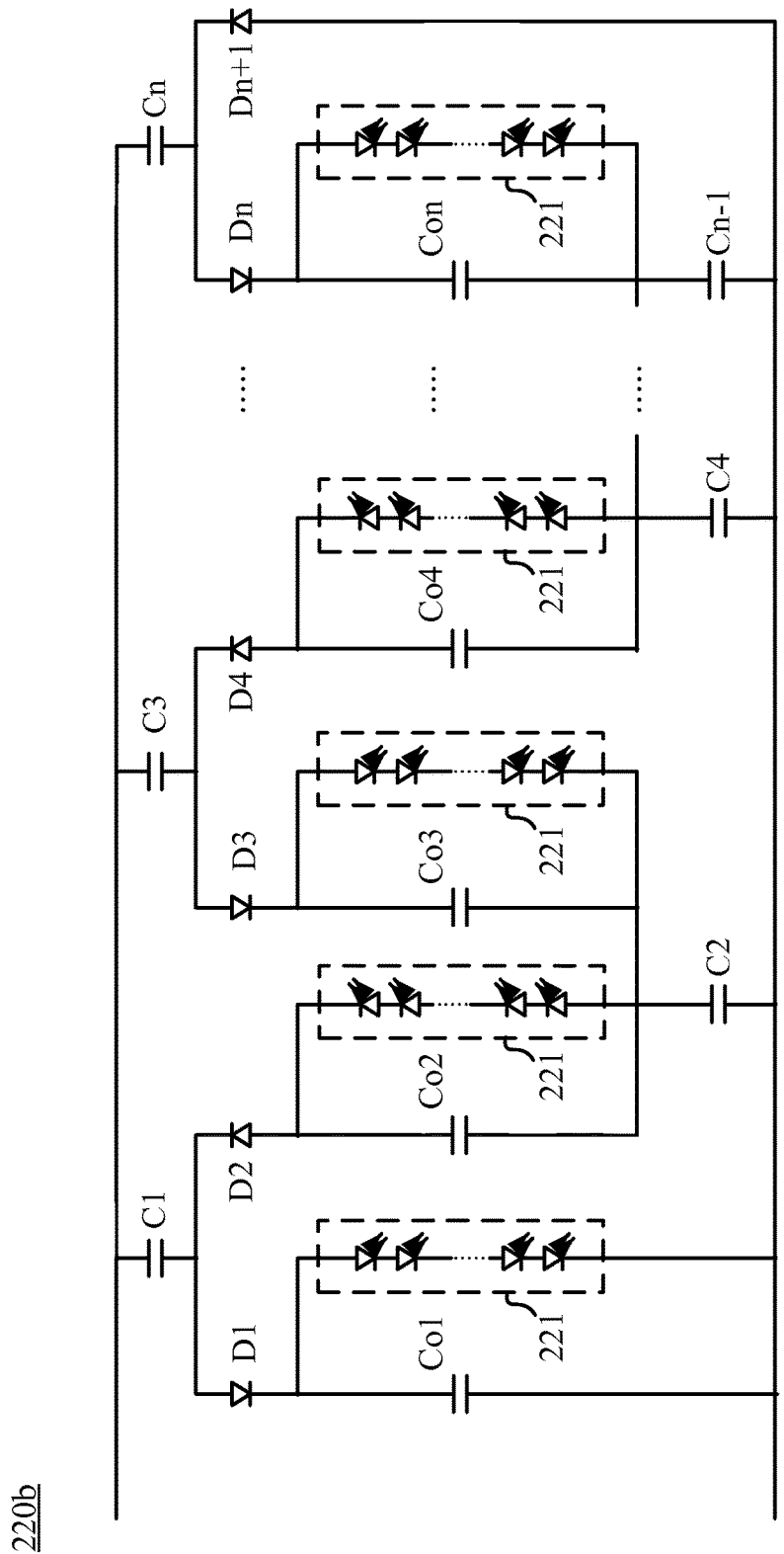
FIG. 9b depicts a schematic diagram of a load circuit according to another embodiment of the present disclosure.

FIG. 9b depicts a schematic diagram of a load circuit 220b according to another embodiment of the present disclosure. As shown in FIG. 9b, the load circuit 220b takes several LED series as a load. The load circuit 220b includes n LED series 221, n filter capacitors Co1-Con, (n+1) diodes D1-Dn+1 and n balanced capacitors. The filter capacitors Co1-Con are coupled to the LED series 221 in parallel respectively. The LED series 221 coupled to the diodes D1-Dn in series respectively. The electrodes of the LED series 221 coupled to the odd diodes (e.g., D1, D3, ..., Dn) are different from the electrodes of the LED series 221 coupled to the even diodes (e.g., D2, D4, ..., Dn−1), n is an odd number. In the present embodiment, the cathodes of the odd diodes are coupled to the anodes of the LED series 211 in series, the anodes of the even diodes are coupled to the cathodes of the LED series 211 in series, but the present embodiment is not limited thereto.

Moreover, one terminal of a first LED series 221 is serially coupled to one terminal of the diode D1. Another terminal of the diode D1 is coupled to one terminal of the converter through the balanced capacitor C1. Another terminal of the first LED series 221 is coupled to another terminal of the converter. An Nth LED series 221 is serially coupled to one terminal of the diode Dn. Another terminal of the diode Dn is coupled to one terminal of the converter through the balanced capacitor Cn. Another terminal of the Nth LED series 221 is coupled to another terminal of the converter through the balanced capacitor Cn−1. One terminal of the diode Dn+1 is coupled to one terminal of the converter through the balanced capacitor Cn, and another terminal of the diode Dn+1 is coupled to another terminal of the converter. In other words, an anode of the diode D1 and a cathode of the diode D2 are electrically coupled to the balanced capacitor C1, an anode of the diode D3 and a cathode of the diode D4 are electrically coupled to the balanced capacitor C3, and so forth. An anode of the diode Dn and a cathode of the diode Dn+1 are electrically coupled to the balanced capacitor Cn. Moreover, the LED series 221 which is connected parallely to the filter capacitor Co2 and the LED series 221 which is connected parallely to the filter capacitor Co3 are connected serially to balanced capacitor C2, the LED series 221 which is connected parallely to the filter capacitor Co4 and the LED series 221 which is connected parallely to the filter capacitor Co5 are connected serially to balanced capacitor C4, and so forth. The LED series 221 which is connected parallely to the filter capacitor Con–1 (not shown in the figure) and the LED series 221 which is connected parallely to the filter capacitor Con are connected serially to balanced capacitor Cn–1. Accordingly, all LED series of the load circuit 220b can be operated in constant-current mode.

The load circuit 220 of FIG. 2, FIG. 5, and FIG. 6 may be the load circuit 220a of FIG. 9a which takes a single LED series as a load or the load circuit 220b of FIG. 9b which takes several LED series as a load, but the present disclosure is not limited thereto.

Figure 10:
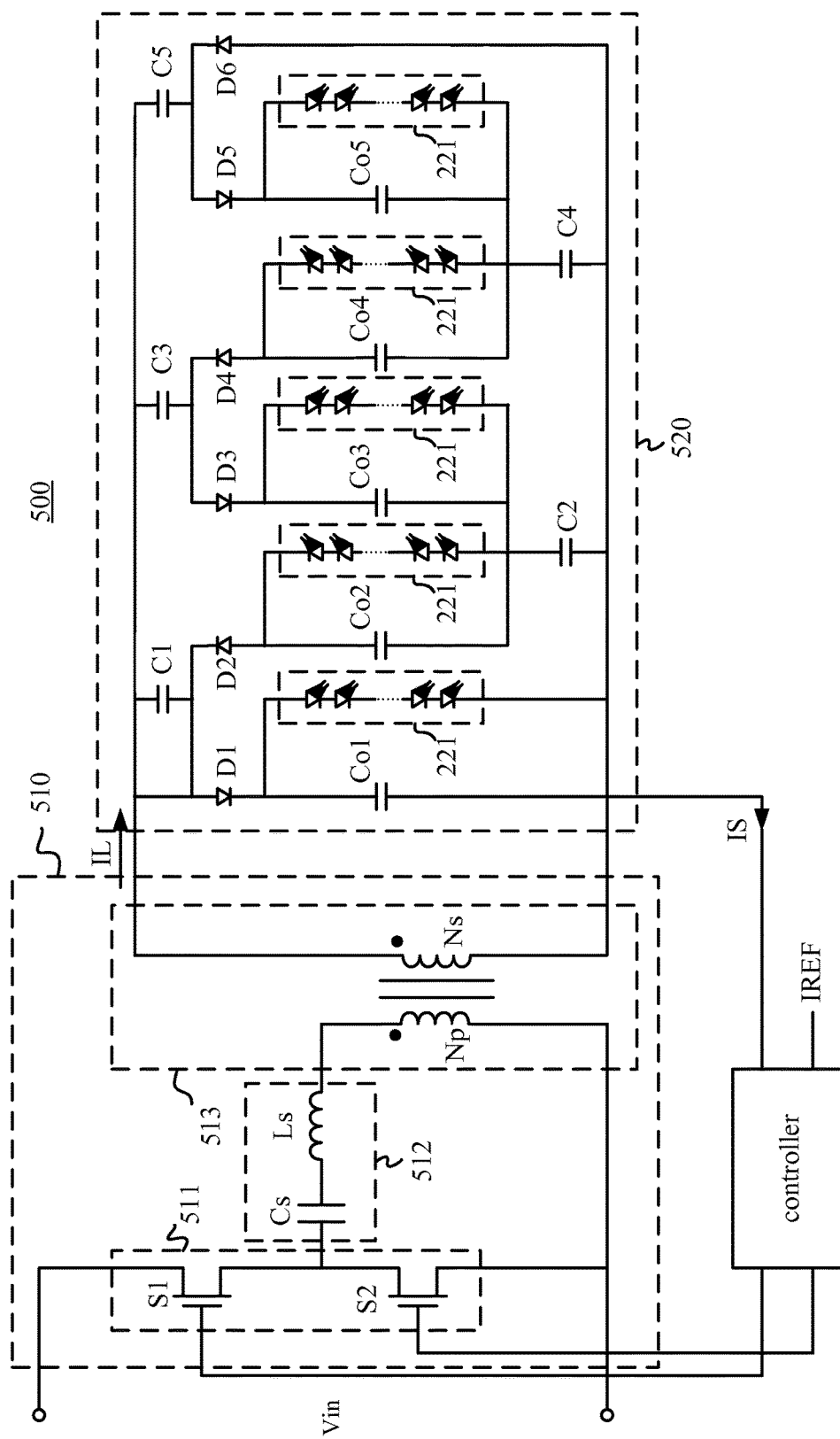
FIG. 10 depicts a schematic diagram of a light-regulating apparatus according to a fourth embodiment of the present disclosure.

FIG. 10 depicts a schematic diagram of a light-regulating apparatus 500 according to a fourth embodiment of the present disclosure. As shown in FIG. 10, the light-regulating apparatus 500 includes a converter 510, a load circuit 520 and a controller 530. The converter 510 includes a switch circuit 511, a resonant circuit 512 and a transformer 513. The resonant circuit 512 is electrically coupled between the switch circuit 511 and a primary winding Np of the transformer 513. A secondary winding Ns of the transformer is electrically coupled to the load circuit 520. In the present embodiment, the switch circuit includes switches S1 and S2, in which the switches S1 and S2 are coupled to an input voltage source Vin such that the converter 510 is a half bridge converter circuit. In another embodiment, the switches S1 and S2 may be coupled to various input voltage sources such that the converter 510 is a full bridge converter circuit, but the present disclosure is not limited thereto. In one embodiment, the resonant circuit 512 may be an LLC resonant circuit, an LC resonant circuit, or an LCC resonant circuit. In the present embodiment, the resonant circuit 512 includes a resonant capacitor Cs and a resonant inductor Ls, that is, the converter 512 is an LLC resonant converter. The converter 512 may be an LC resonant converter or an LCC resonant converter, but the present embodiment is not limited thereto.

The load circuit 520 may be the load circuit 220a of FIG. 9a or the load circuit 220b of FIG. 9b. In the present embodiment, the load circuit 520 takes five LED series 521 as a load, but the present embodiment is not limited thereto. The connection may be referred to the load circuit 220b of FIG. 9b, and thus they are not further detailed herein.

In one operation, the switch circuit 511 receives an input voltage Vin. The input voltage Vin is stored in the primary winding Np of the transformer 513 through the resonant capacitor Cs and the resonant inductor Ls. Next, an output voltage is formed in the secondary winding Ns of the transformer 513. The output voltage corresponds to the load current signal IL provided to the load circuit 520. The controller 530 implements a constant current control by sensing the feedback signal IS corresponding to the load current signal IL. The controller 530 may be the controller 230a, 230b, or 230c, but the present embodiment is not limited thereto. The control approach may be referred to the aforementioned embodiments, and thus they are not further detailed herein.

It is noted that the feedback signal IS which is corresponding to the load current signal IL may be obtained by detecting a effective value, a peak value, or a rectified average value of a primary current of a transformer (not shown in the figure) in the converter 510, or by detecting a effective value, a peak value, or a rectified average value of a secondary current of the transformer in the converter 510, or by detecting a current signal through any LED series 221 of the load circuit 520.

Figure 11:
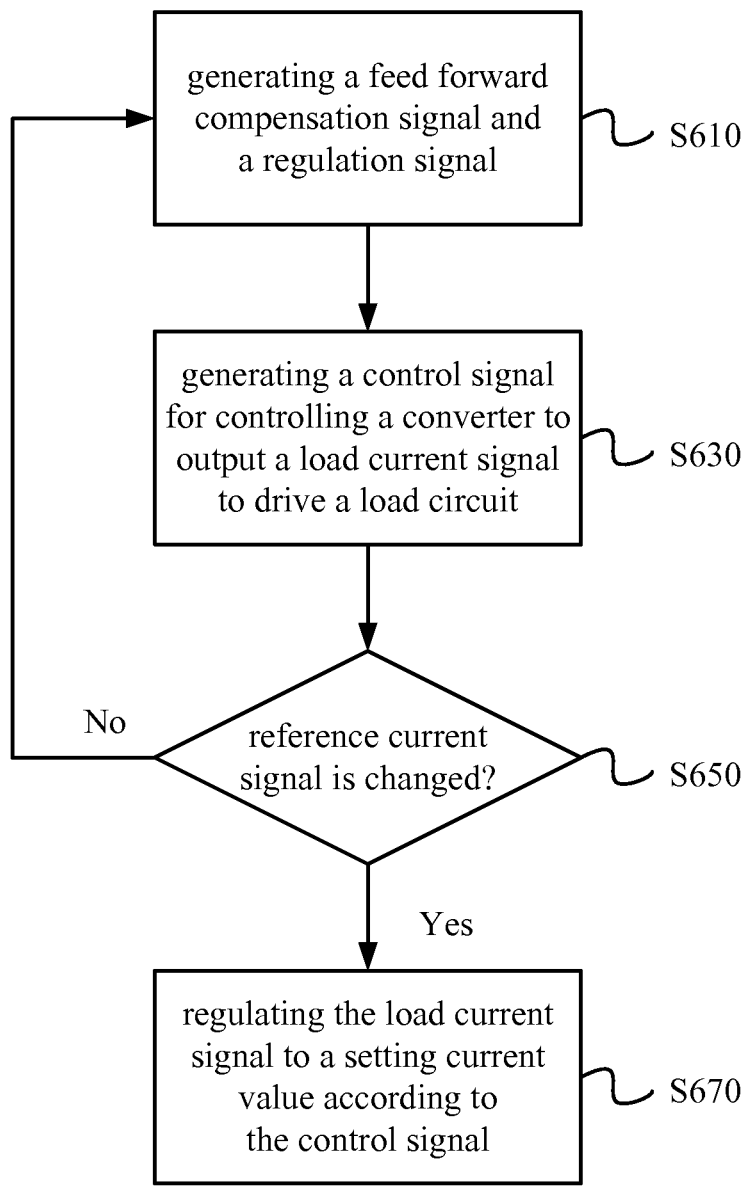
FIG. 11 depicts a flowchart of a light-regulating method according to one embodiment of the present disclosure.

FIG. 11 depicts a flowchart of a light-regulating method according to one embodiment of the present disclosure. In order to clearly describe the present embodiment, the light-regulating method is described with the light-regulating apparatus 200 of FIG. 2 and the timing diagram of FIG. 3, but operations of the light-regulating method of FIG. 11 is not limited by the embodiment of FIG. 2 and the embodiment of FIG. 3. First, in operation S610, the reference current signal IREF is received and the feed forward compensation signal IF is generated by the feed forward compensation unit 232 according to the reference current signal IREF. The reference current signal IREF and the feedback signal IS are received by the error computation unit 233. The first error signal IE is generated by the error computation unit 233 by comparing the reference current signal IREF and the feedback signal IS and the first error signal IE is transmitted to the regulation unit 231. The regulation signal IR is generated by the regulation unit 231 according to the regulation signal IR. Next, is operation S630, the control signal IC is generated according to the feed forward compensation signal IF and the regulation signal IR, that is, the control signal IC is generated by adding the feed forward compensation signal IF and the regulation signal IR by the addition unit 234. The control signal is configured to control the converter 210 to generate the load current signal IL for driving the load circuit 220.

In operation S650, a determination is made as to whether the reference current signal IREF is changed, that is, a determination is made as to whether a luminance of the load circuit 220 is regulated. When the reference current signal IREF is not changed, operation S610 is executed. When the reference current signal IREF is changed, operation S670 is executed. In operation S670, the converter 210 is regulated by the control signal IC which is generated according to the feed forward compensation signal IF and the regulation signal IR. The regulating approach may be changing an operation frequency of the converter 210 or a duty cycle of the converter 210. Accordingly, the load current signal IL generated from the converter 210 is regulated, and the load current signal IL is regulated to a setting current value according to the control signal IC. The setting current value may be a stable value of load current signal. The stable value of load current signal is any value between 90% and 110% of an operating load current signal IL corresponding to the reference current signal IREF, but the present embodiment is not limited thereto.

Figure 12:
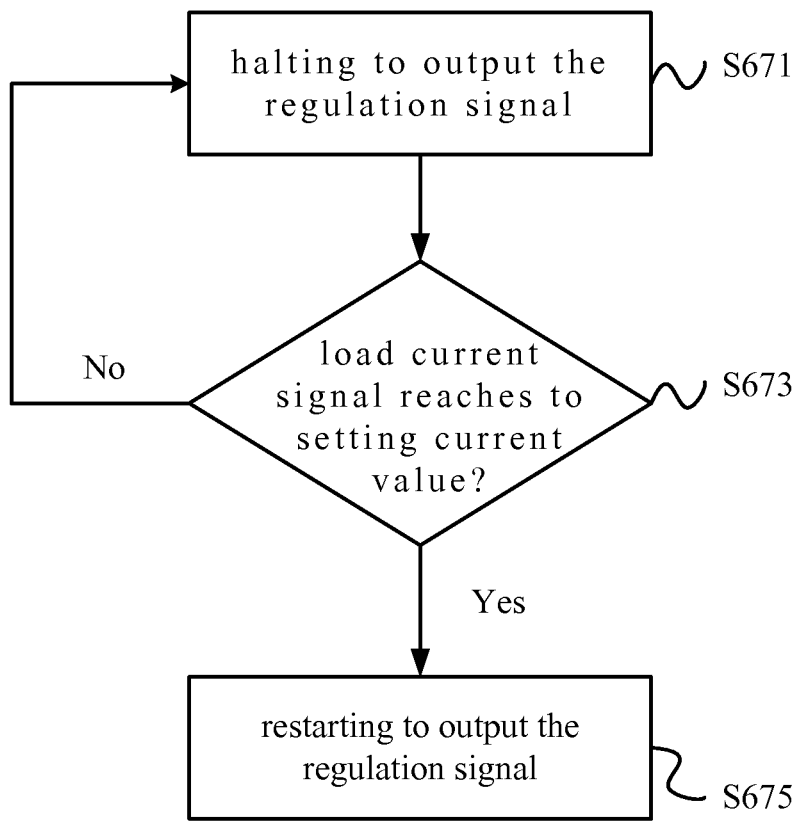
FIG. 12 depicts a flowchart of one of operations in FIG. 11 according to one embodiment of the present disclosure.

The reference is now made to FIG. 4, FIG. 5, and FIG. 12. FIG. 12 depicts a flowchart of one of operations (e.g., operation S670) in FIG. 11 according to one embodiment of the present disclosure. When the reference current signal IREF is changed, the following operation S670 may further includes operations S671-S675. In operation S671, the regulation signal IR halts to be outputted. In other words, the control signal IC is determined only by the feed forward compensation signal IF, and the converter 210 is regulated by the feed forward compensation signal IF. Next, in operation S673, a determination is made as to whether the load current signal IL is stable, that is, a determination is made as to whether the load current signal IL reaches to a setting current value. When the load current signal IL is not stable yet, operation S671 is executed, that is, the regulation signal IR halts to be outputted. When the load current signal IL is stable, operation S675 is executed. In operation S675, the regulation signal IR restarts to be outputted. Next, operation S610 of FIG. 11 is executed.

Figure 13:
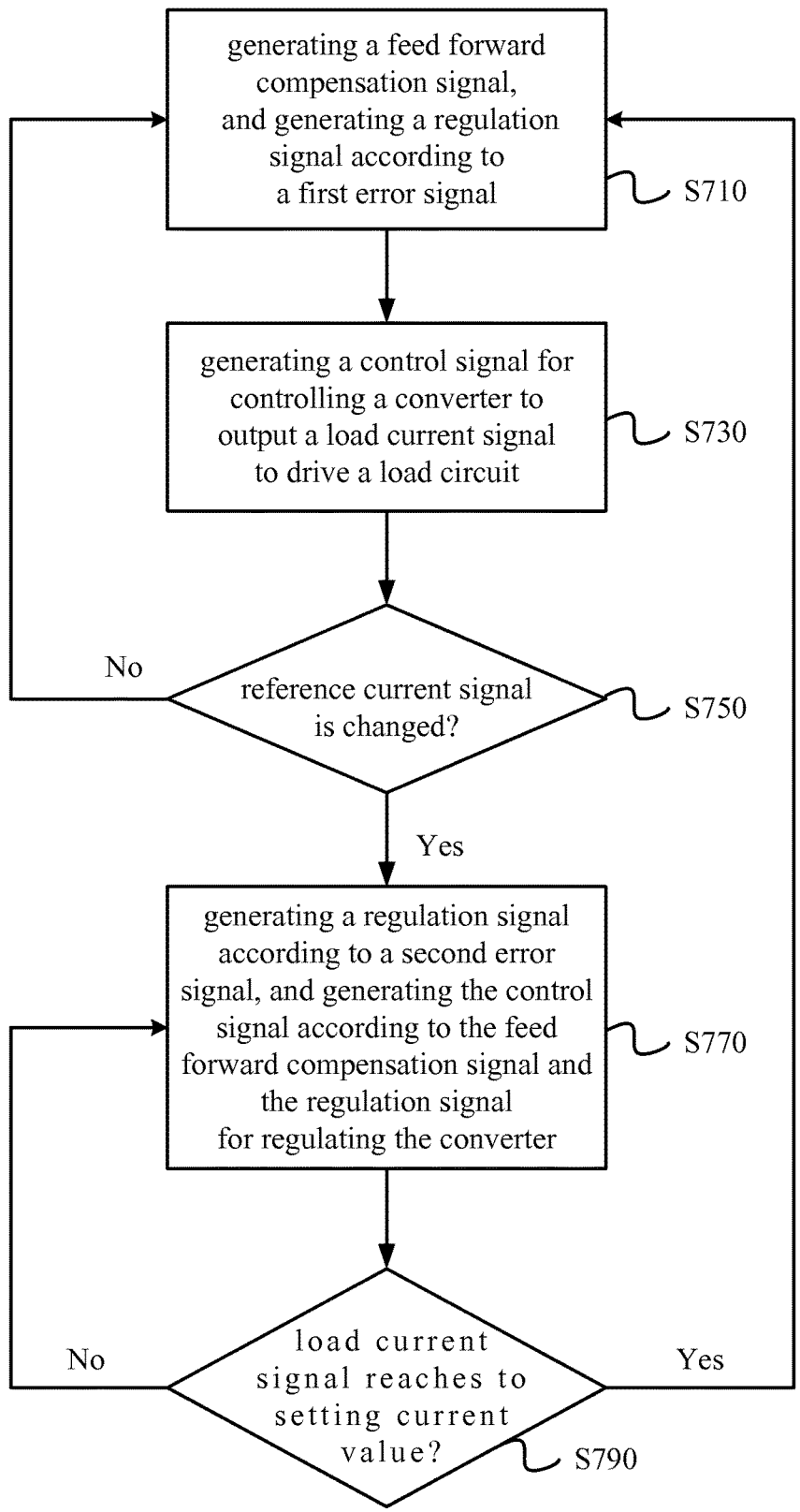
FIG. 13 depicts a flowchart of a light-regulating method according to another embodiment of the present disclosure.

FIG. 13 depicts a flowchart of a light-regulating method according to another embodiment of the present disclosure. In order to clearly describe the present embodiment, the light-regulating method is described with the light-regulating apparatus 400 of FIG. 6 and the timing diagram of FIG. 7, but operations of the light-regulating method of FIG. 13 is not limited by the embodiment of FIG. 6 and the embodiment of FIG. 7. First, in operation S710, the reference current signal IREF is received and the feed forward compensation signal IF is generated by the feed forward compensation unit 232 according to the reference current signal IREF. The reference current signal IREF and the feedback signal IS are received by the error computation unit 233. The first error signal IE is generated by the error computation unit 233 by comparing the reference current signal IREF and the feedback signal IS, and the first error signal IE is transmitted to the regulation unit 231. The regulation signal IR is generated by the regulation unit 231 according to the regulation signal IR. Next, is operation S730, the control signal IC is generated according to the feed forward compensation signal IF and the regulation signal IR, that is, the control signal IC is generated by adding the feed forward compensation signal IF and the regulation signal IR by the addition unit 234. The control signal is configured to control the converter 210 to generate the load current signal IL for driving the load circuit 220.

In operation S750, a determination is made as to whether the reference current signal IREF is changed, that is, a determination is made as to whether a luminance of the load circuit 220 is regulated. When the reference current signal IREF is not changed, operation S710 is executed. When the reference current signal IREF is changed, operation S770 is executed. In operation S770, the second error signal IE2 is generated by comparing the feedback signal IS with the feedback signal IS. The regulation signal IR is generated according to the second error signal IE2. The converter 210 is regulated by the control signal IC which is generated according to the feed forward compensation signal IF and the regulation signal IR. Since the second error signal IE2 is approximately zero, the control signal is approximately determined by the feed forward compensation signal IREF. Moreover, the control signal IC may be configured to change an operation frequency of the converter 210 or a duty cycle of the converter 210. Accordingly, the load current signal IL generated from the converter 210 is regulated, and the load current signal IL is regulated to a setting current value according to the control signal IC.

Next, in operation S790, a determination is made as to whether the load current signal IL reaches to a setting current value. The setting current value may be a stable value of load current signal. The stable value of load current signal is any value between 90% and 110% of the operating load current signal corresponding to the reference current signal IREF, but the present embodiment is not limited thereto. When the load current signal IL reaches to the setting current value, operation S710 is executed. When the load current signal IL does not reach to the setting current value yet, operation S770 is executed.

As illustrated from the aforementioned embodiments of the present disclosure, a load current can be rapidly regulated by regulating an operating frequency or a duty cycle of a converter according to a feed forward compensation signal and a regulation signal. In one experimental result of the present disclosure, when a load current is regulated from 10% to 100% of a setting current value, time for the load current to rise or fall is substantially 50 microseconds (us). Moreover, when in a light regulation process, an over-regulation of the load current can be avoid by the control approaches of FIG. 4 or FIG. 7. Furthermore, not only can the load current be rapidly regulated, but also conversion efficiency of a converter reaches to substantially 90% in the present disclosure.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A light-regulating apparatus, comprising:
   a converter configured to generate a load current signal according to a control signal;
   a load circuit driven by the load current signal; and
   a controller configured to generate the control signal, comprising:
   an error computation unit configured to generate a first error signal according to a reference current signal and a feedback signal;
   a regulation unit configured to generate a regulation signal according to the first error signal;
   a feed forward compensation unit configured to generate a feed forward compensation signal according to the reference current signal; and
   an addition unit configured to generate the control signal according to the regulation signal and the feed forward compensation signal;
   wherein when the load current signal is regulated, the feed forward compensation signal remains unvaried, and
   wherein when the reference current signal is changed, the controller generates the control signal to regulate the load current signal outputted from the converter, the feed forward compensation unit generates the feed forward compensation current to the addition unit and the regulation unit halts to output the regulation signal to the addition unit; when the controller regulates the load current signal to a setting current, the regulation unit output the regulation signal to the addition unit.

2. The light-regulating apparatus of claim 1, wherein the load circuit comprises at least one light emitting component, the at least one light emitting component comprises a light emitting diode or a laser component.

3. The light-regulating apparatus of claim 1, wherein the feedback signal is corresponding to the load current signal.

4. The light-regulating apparatus of claim 3, wherein the feedback signal is obtained by detecting an effective value, a peak value, or a rectified average value of a primary current of a transformer in the converter, or by detecting a effective value, a peak value, or a rectified average value of a secondary current of the transformer in the converter, or by detecting a current signal of the load circuit.

5. The light-regulating apparatus of claim 1, wherein the controller comprises a switch unit electrically coupled between the regulation unit and the addition unit, wherein when the reference current signal is changed, the controller controls the switch unit to be cut off; when the controller regulates the load current signal to the setting current value, the controller controls the switch unit to be conducted.

6. The light-regulating apparatus of claim 1, wherein the controller further comprises a selection unit, wherein the selection unit comprises:
   a first terminal configured to receive the reference current signal;
   a second terminal configured to receive the feedback current; and
   a third terminal electrically coupled to the error computation unit;
   wherein when the controller regulates the load current signal to a setting current value, the selection unit switches the first terminal to be electrically coupled to the third terminal, the error computation unit compares the reference current signal with the feedback signal to generate the first error signal, and the regulation unit generates the regulation signal according to the first error signal; when the reference current signal is changed, the selection unit switches the second terminal to be electrically coupled to the third terminal, the error computation unit compares the feedback signal with the feedback signal to generate a second error signal, and the regulation unit generates the regulation signal according to the second error signal.

7. The light-regulating apparatus of claim 1, wherein the setting current value is a stable value of the load current signal.

8. The light-regulating apparatus of claim 1, wherein the control signal is configured to regulate an operating frequency or a duty cycle of the converter.

9. The light-regulating apparatus of claim 1, wherein the converter is a half bridge converter circuit or a full bridge converter circuit.

10. The light-regulating apparatus of claim 1, wherein the converter comprises a switch circuit, a resonant circuit and a transformer, the resonant circuit is electrically coupled between the switch circuit and a primary winding of the transformer, a secondary winding of the transformer is electrically coupled to the load circuit.

11. The light-regulating apparatus of claim 10, wherein the resonant circuit is an LC resonant circuit, an LLC resonant circuit or an LCC resonant circuit.

12. A light-regulating method, comprising:
   generating a feed forward compensation signal according to a reference current signal;
   generating a first error signal according to the reference current signal and a feedback signal;
   generating a regulation signal according to the first error signal;
   generating a control signal for controlling a converter to output a load current signal according to the feed forward compensation signal and the regulation signal, wherein the load current signal is configured to drive a load circuit; and
   regulating the load current signal according to the control signal when the reference current signal is changed, wherein when the load current signal is regulated, the feed forward compensation signal remains unvaried,
   wherein when the reference signal is changed, further comprising,
   generating the feed forward compensation signal and halting to output the regulation signal when the reference signal is changed; and
   outputting the regulation signal when the load current signal is regulated to a setting current value.

13. The light-regulating method of claim 12, wherein when load current signal is regulated to a setting current value, comparing the reference current signal with the feedback signal to generate the first error signal and generating the regulation signal according to the first error signal; and when the reference current is changed, generating the feed forward compensation signal, comparing the feedback signal with the feedback signal to generate a second error signal and generating the regulation signal according to the second error signal.

14. The light-regulating method of claim 12, wherein the control signal is configured to regulate an operating frequency or a duty cycle of the converter.

\* \* \* \* \*